(12) United States Patent
Thong et al.

(10) Patent No.: US 8,144,560 B2
(45) Date of Patent: Mar. 27, 2012

(54) METHOD FOR PREVENTING INTERCHANGE OF OPTICAL INFORMATION CARRIERS

(75) Inventors: Chee Kang Thong, Singapore (SG); Rain Zhang, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 871 days.

(21) Appl. No.: 11/910,619

(22) PCT Filed: Mar. 22, 2006

(86) PCT No.: PCT/IB2006/050885
§ 371 (c)(1),
(2), (4) Date: Oct. 4, 2007

(87) PCT Pub. No.: WO2006/106444
PCT Pub. Date: Oct. 12, 2006

(65) Prior Publication Data
US 2008/0209456 A1    Aug. 28, 2008

(30) Foreign Application Priority Data
Apr. 4, 2005 (EP) .................................... 05102615

(51) Int. Cl.
*G11B 17/04* (2006.01)
(52) U.S. Cl. ............... 369/59.23; 369/53.33; 369/30.05; 369/53.21; 369/30.19; 726/27; 726/30; 386/252
(58) Field of Classification Search ................ 369/53.2, 369/59.23, 53.22, 53.33, 53.37, 53.42, 94, 369/30.05, 30.19, 53.21; 726/26, 32, 33, 726/27, 30; 386/252
See application file for complete search history.

(56) References Cited

U.S. PATENT DOCUMENTS

| 5,809,006 | A  | * | 9/1998 | Davis et al. ................. 369/47.49 |
| 6,678,221 | B2 |   | 1/2004 | Fujimoto |
| 6,760,289 | B1 |   | 7/2004 | Ide |
| 2001/0012259 | A1 | * | 8/2001 | Ogawa .......................... 369/178 |
| 2003/0174617 | A1 |   | 9/2003 | Kim et al. |

(Continued)

FOREIGN PATENT DOCUMENTS

| EP | 0718838 A2 | 6/1996 |
| EP | 1067538 A1 | 1/2001 |
| EP | 0784320 B1 | 10/2002 |

(Continued)

OTHER PUBLICATIONS

Written Opinion of the Internatioanl Searching Authority for International Application No. PCT/IB2006/050885.

*Primary Examiner* — Wayne Young
*Assistant Examiner* — Dionne Pendleton

(57) ABSTRACT

The invention relates to a method for preventing interchange of a first optical information carrier (1) with a second optical information carrier in an optical drive. Initially, the light (5) is focused at the first optical information carrier (1) in the optical apparatus followed by the steps of detecting reflected light (8) from the first optical information carrier (1) and generating a plurality of signals (CA, RF, FE) from the detected light (8), such as a focus error signal (FE). Upon obtaining an indication of a signal, e.g. the focus error signal (FE), is absent or reduced below a certain level, there is a step of assessing if the first optical information carrier (1) has been removed from the optical drive. If removed, reproduction of information by the optical drive is made impossible until some pre-determined measures have been taken, e.g. restart of the optical drive or other measures.

10 Claims, 4 Drawing Sheets

U.S. PATENT DOCUMENTS

Figure 1:
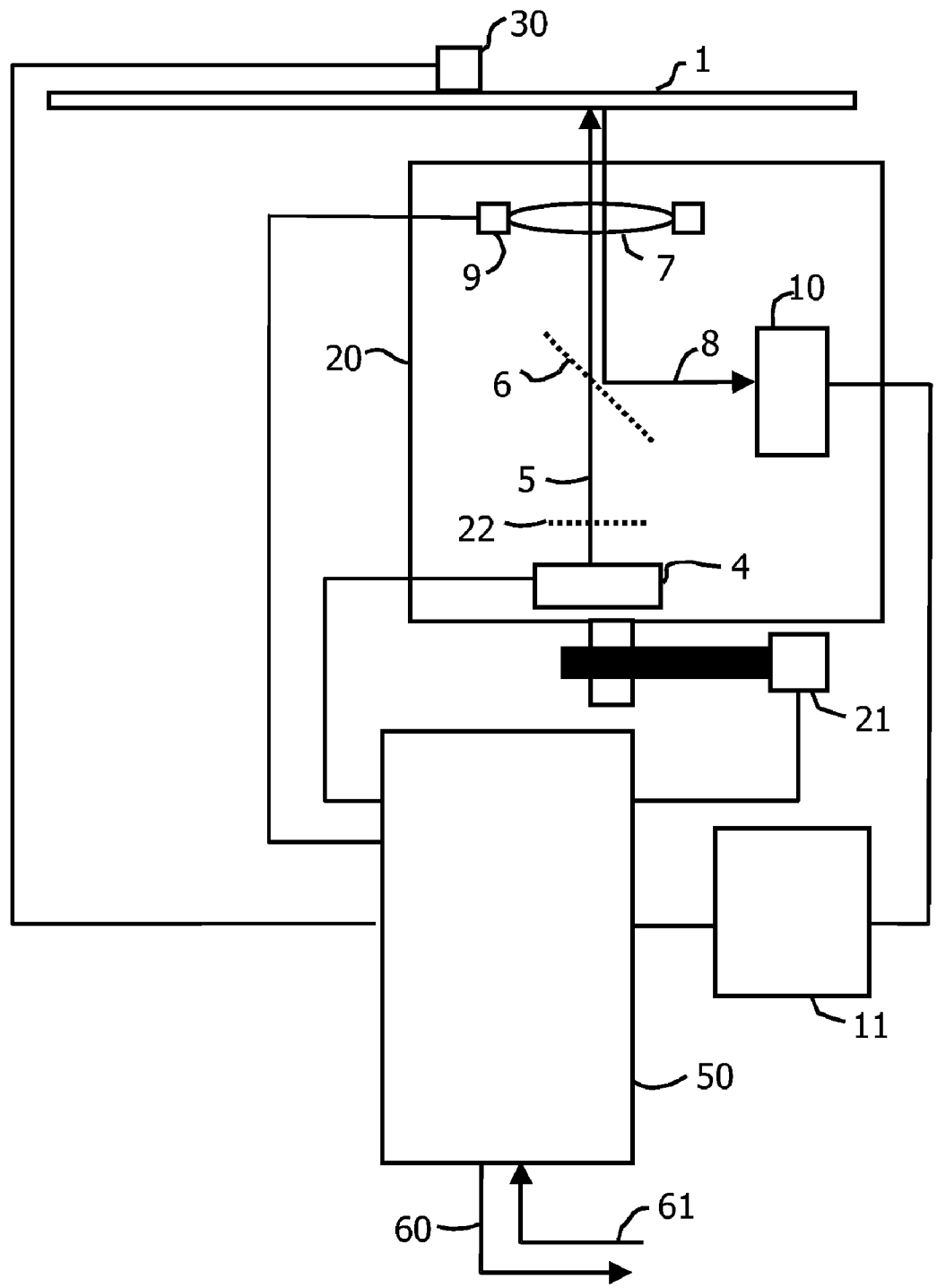

| | | | |
|---|---|---|---|
| 2005/0007922 A1* | 1/2005 | Ujino | 369/53.2 |
| 2005/0073926 A1* | 4/2005 | Lee | 369/53.2 |
| 2005/0088937 A1* | 4/2005 | Hung | 369/53.2 |
| 2009/0103404 A1* | 4/2009 | Chiu | 369/47.5 |

FOREIGN PATENT DOCUMENTS

| | | |
|---|---|---|
| JP | 55038663 | 3/1980 |
| JP | 2002157751 | 5/2002 |
| WO | 2005069292 A1 | 7/2005 |

\* cited by examiner

METHOD FOR PREVENTING INTERCHANGE OF OPTICAL INFORMATION CARRIERS

The present invention relates to a method for preventing interchange of a first optical information carrier with a second optical information carrier in an optical apparatus. The invention further relates to an optical apparatus being capable of reproducing information from an optical information carrier and being capable of preventing interchange of a first optical information carrier with a second optical information carrier in the optical apparatus.

Optical information carriers used for reproducing information in suitable optical apparatuses is becoming more and more popular for audio, audio-visual and game purposes. With respect to audio-visual purposes the digital versatile disc (DVD) is presently a good example of such a technology. This format is believed to be gradually replaced by the emerging Blu-Ray (BD) format. For gaming purposes, information can be stored on compact disc read-only-memory (CD-ROM) or digital versatile disc (DVD) intended for reproduction on a personal computer (PC) or similar. Recently, also so-called game boxes with dedicated computer and audio systems for gaming have emerged, such as Sony's Play Station (PS and PS2) and Microsoft's XBOX.

Parallel to the growth in the use of optical information carriers, there is an unfortunate growth in the illegal or unauthorized copying of original information carriers, so-called piracy. This growth in illegal copies has been facilitated by the relative ease and accessibility of commercial copy equipment such as CD and DVD recording devices. Anti-piracy measures against this tendency include encryption codes to be manually keyed to the reproducing system prior to reproduction and dedicated encryption sections on the optical information carriers to be read out prior to reproduction, the latter encryption sections may preferably be impossible to copy at least by conventional recording equipment. However, such encryption sections are typically provided only on a quite limited part of the optical information carrier and may be avoided in various ways; e.g. by providing dedicated pieces of piracy software circumventing the sections, and switching optical information carriers between legal and illegal copies after reading of the encryption section on the legal copy.

Hence, an improved method for avoiding illegal use of optical information carriers would be advantageous, and in particular a more efficient and/or reliable method would be advantageous.

Accordingly, the invention preferably seeks to mitigate, alleviate or eliminate one or more of the above-mentioned disadvantages singly or in any combination. In particular, it may be seen as an object of the present invention to provide a method that solves the above mentioned problems of the prior art with circumventing anti-piracy measures of optical information carriers.

This object and several other objects are obtained in a first aspect of the invention by providing a method for preventing interchange of a first optical information carrier with a second optical information carrier in an optical apparatus, the optical apparatus being capable of reproducing information from an optical information carrier, the method comprising the steps of:
  focusing the light at the first optical information carrier in the optical apparatus,
  detecting reflected light from the first optical information carrier,
  generating a plurality of signals from the detected light, and
  upon obtaining an indication of at least one signal being absent or reduced, assessing if the first optical information carrier has been removed from the optical apparatus, and if removed, rendering any further reproduction of information by the optical apparatus impossible until some pre-determined measures have been taken.

The invention is particularly, but not exclusively, advantageous for preventing interchange of information carriers in order to circumvent anti-piracy measures, such as encryption sections on a first optical information carrier, i.e. an carrier with information not intended for copying only reproduction, being replaced after reading of the encryption sections with an second optical information carrier, i.e. an unauthorized copy of the first carrier original carrier. This may in particularly take place in a situation where several optical reproducing devices are present at the same location where e.g. a single original copy of a carrier and several illegal copies are provided. Interchanging or "swapping" of carriers may be done after reading of the encryptions sections of the original carrier resulting in that the optical reproducing devices may effectively circumvent the anti-piracy measures with a single original and several illegal copies.

In particular, the plurality of signals may comprise at least one control signal, said control signal being applicable for controlling the relative position of the light on the first carrier as such control signals are relatively sensitive to carrier variations and irregularities. Preferably, the at least one control signal is applied for controlling the focal position of the focused light. Beneficially, a step of displacing the focal position of the focused light by transverse to the carrier is applied in order to discriminate between carrier removal and other defects etc.

The plurality of signals may comprise at least one information signal, said information signal being indicative of information stored on the first optical information carrier, and the information signal may also be applicable to assess if the carrier is removed.

Beneficially, the indication that an at least one signal is absent may be provided by comparing said at least one signal with a pre-determined threshold level. Alternatively, the indication that an at least one signal is absent may be provided by sampling said at least one signal substantially continuously, though this is more tedious it is also more accurate and may facilitate more advanced analysis, e.g. peak-to-peak levels, duty cycles.

If it is assessed that the carrier is removed, the pre-determined measures may comprise the step of reproducing encryption information from the first optical information carrier again in order to ensure that the encryption code is not circumvented by the user. Alternatively, the optical apparatus may be disabled, either temporally or permanently.

In a second aspect, the invention relates to an optical apparatus capable of reproducing information from an optical information carrier, the apparatus comprising:
  a light source capable of emitting light onto the optical information carrier,
  focusing means for focusing the light on the optical information carrier,
  photo detection means for detecting reflected light from the optical information carrier, and
  generating means for generating signals from the photo detection means,
  wherein upon obtaining an indication of at least one signal being absent or reduced, assessing if the first optical information carrier has been removed from the optical apparatus, and if removed, the optical apparatus is adapted to render any further reproduction of information impossible until some pre-determined measures have been taken.

In a third aspect, the invention relates to a computer program product being adapted to enable a computer system comprising at least one computer having data storage means associated therewith to control an optical recording apparatus according to the first aspect of the invention.

This aspect of the invention is particularly, but not exclusively, advantageous in that the present invention may be implemented by a computer program product enabling a computer system to perform the operations of the first aspect of the invention. Thus, it is contemplated that some known optical reproducing apparatus may be changed to operate according to the present invention by installing a computer program product on a computer system controlling the said optical recording apparatus. Such a computer program product may be provided on any kind of computer readable medium, e.g. magnetically or optically based medium, or through a computer based network, e.g. the Internet.

The first, second and third aspect of the present invention may each be combined with any of the other aspects. These and other aspects of the invention will be apparent from and elucidated with reference to the embodiments described hereinafter.

Figure 2:
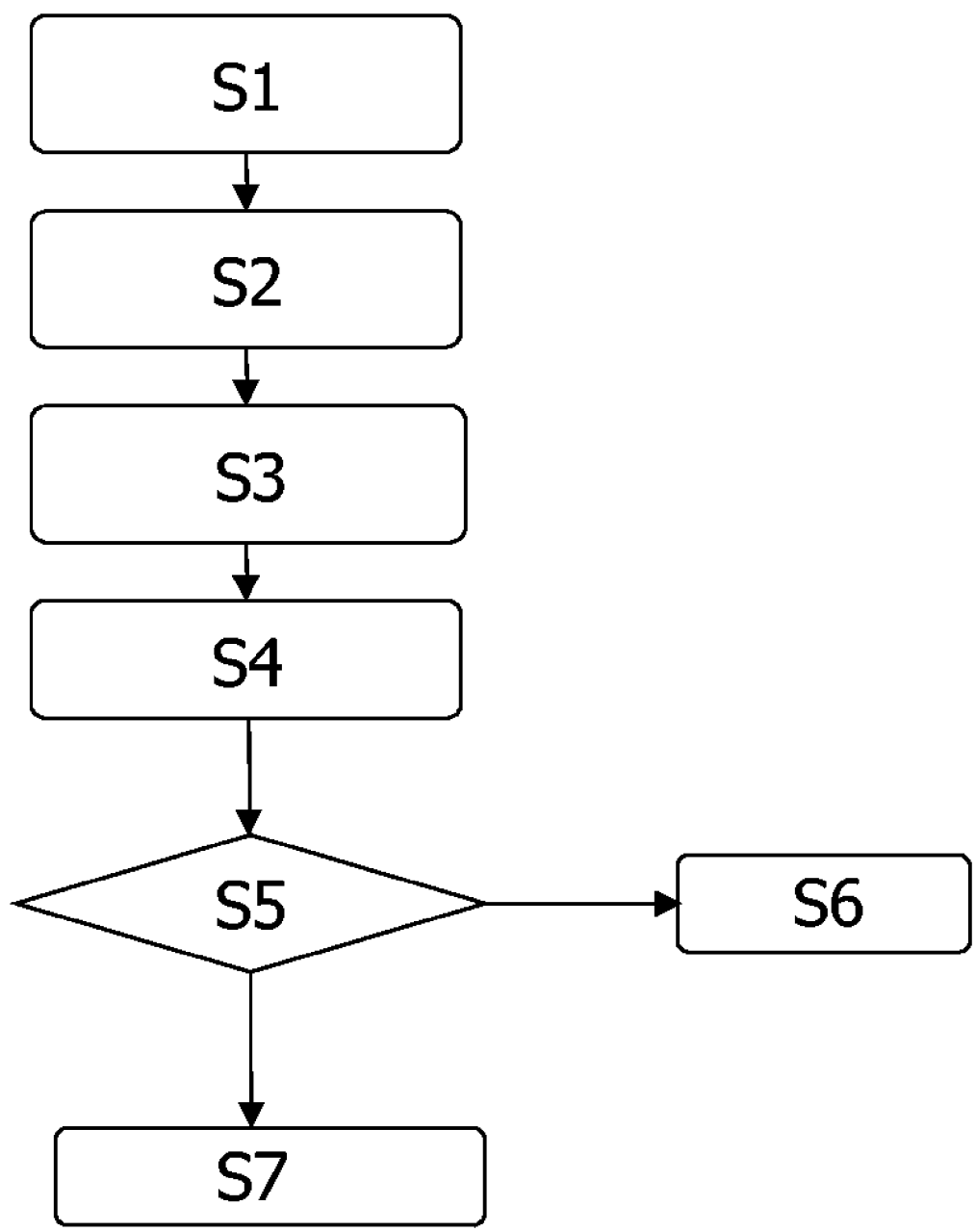
Figure 3:
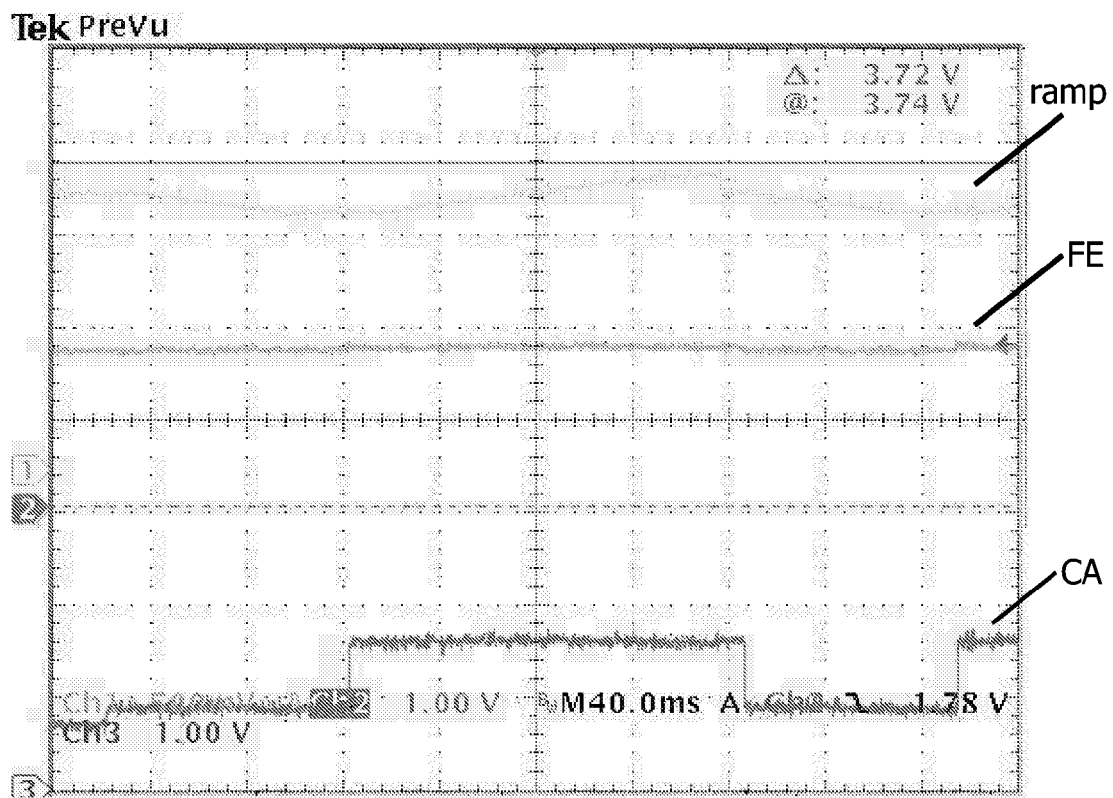
Figure 4:
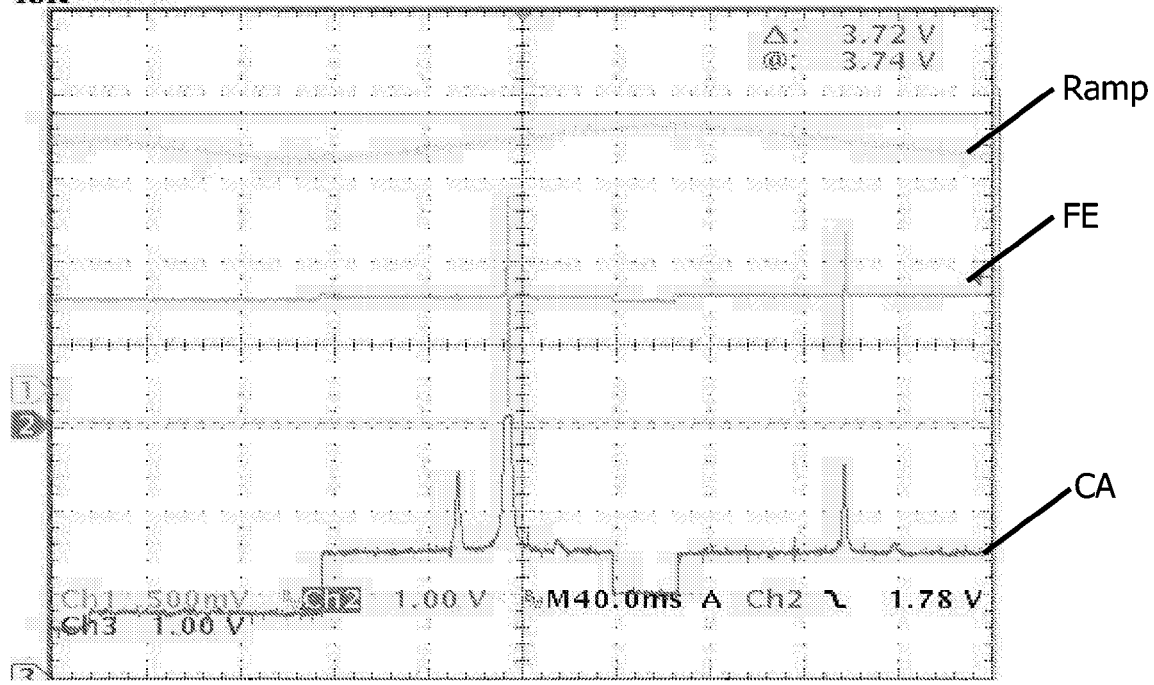

The present invention will now be explained with reference to the accompanying Figures, where FIG. 1 is a schematic diagram of an embodiment of an optical apparatus according to the second aspect of the invention, FIG. 2 is a flow-chart of the method according to first aspect of the invention, and FIGS. 3 and 4 illustrate corresponding signals respectively without and with an optical carrier.

FIG. 1 shows an optical reproducing apparatus and an optical information carrier 1 according to the invention. The carrier 1 is fixed and rotated by holding means 30.

The carrier 1 comprises a material suitable for recording information by means of a radiation beam 5. The recording material may be of, for example, the magneto-optical type, the phase-change type, the dye type, metal alloys like Cu/Si or any other suitable material. Information may be recorded in the form of optically detectable regions, also called marks for rewriteable media and pits for write-once media, on the carrier 1.

The apparatus comprises an optical head 20, sometimes called an optical pick-up (OPU), the optical head 20 being displaceable by actuation means 21, e.g. an electric stepping motor. The optical head 20 comprises a photo detection system 10, a radiation source 4, a beam splitter 6, an objective lens 7, and lens displacement means 9. The optical head 20 also comprises beam splitting means 22, such as a grating or a holographic pattern that is capable of splitting the radiation beam 5 into at least three components for use in the three spot differential push-pull radial tracking control method. For reason of the clarity the radiation beam 5 is shown as a single beam after passing through the beam splitting means 22. Similarly, the radiation 8 reflected also comprises more than one component, e.g. the three spots and diffractions thereof, but only one beam 8 is shown in FIG. 1 for clarity.

The function of the photo detection system 10 is to convert radiation 8 reflected from the carrier 1 into electrical signals. Thus, the photo detection system 10 comprises several photo detectors, e.g. photodiodes, charged-coupled devices (CCD), etc., capable of generating one or more electric output signals that are transmitted to a pre-processor 11. The photo detectors are arranged spatially to one another, and with a sufficient time resolution so as to enable detection of focus (FE) and radial tracking (RTE) errors in the pre-processor 11. Thus, the pre-processor 11 transmits focus (FE) and radial tracking error (RTE) signals to the processor 50. The photo detection system 10 can also transmit a read signal or RF signal representing the information being read from the carrier 1 to the processor 50 through the pre-processor 11. The read signal may possibly converted to a central aperture (CA) signal by a low-pass filtering of the RF signal in the processor 50.

The radiation source 4 for emitting a radiation beam 5 can for example be a semiconductor laser with a variable power, possibly also with variable wavelength of radiation. Alternatively, the radiation source 4 may comprise more than one laser.

The optical head 20 is optically arranged so that the radiation beam 5 is directed to the optical carrier 1 via a beam splitter 6, and an objective lens 7. Radiation 8 reflected from the carrier 1 is collected by the objective lens 7 and, after passing through the beam splitter 6, falls on a photo detection system 10 which converts the incident radiation 8 to electric output signals as described above.

The processor 50 receives and analyses output signals from the pre-processor 11. The processor 50 can also output control signals to the actuation means 21, the radiation source 4, the lens displacement means 9, the pre-processor 11, and the holding means 30, as illustrated in FIG. 1. Similarly, the processor 50 can receive data, indicated at 61, and the processor 50 may output data from the reading process as indicated at 60. Upon obtaining an indication of at least one signal being absent or reduced, the processor 50 assess whether this is indicating that the optical carrier 1 has been removed from the optical apparatus. If the carrier 1 has been removed the processor 50 renders any further reproduction of information impossible until some pre-determined measures have been taken. Preferably, the pre-determined measures include a keylock of the processor 50 or the pre-processor 11, a blocking of a main power supply, or blocking of the radiation source 4 etc.

The signal applied for detection of the carrier 1 may be the FE signal, the RF signal, and the CA signal. If the processor 50 detects that one or more of these signals are absent, below a certain threshold level or other irregular and/or unexpected behavior additional steps are initiated to assess if the carrier 1 has been removed. In a particular embodiment, if the focal error or servo signal is lost, the focal position of the light 5 is forced to alternating pattern transverse to the carrier 1 by displacing the focusing lens 7. This is also known as so-called ramping of the focus actuator 9. The ramping is beneficially to discriminate between ordinary focus loss due to e.g. defects on the carrier 1 and the actual removal of the carrier 1. If this ramping does not reveal the presence of the carrier 1 it is assessed that the carrier 1 is removed.

FIG. 2 is a flow-chart of the method according to first aspect of the invention.

In a first step S1, the light 5 is focused at the first optical information carrier 1 in the optical apparatus by the lens 7 moveable by actuator 9.

Then in a second step S2, the reflected light 8 is detected from the first optical information carrier 1. The detection is performed by the detection means 10.

In a third step S3, there is generated a plurality of signals (FE, CA, RF) from the detected light in the pre-processor 11. The reflected light 8 is detected and analyzed to obtain e.g. a focus error (FE) signal applied for minimizing the focal error, i.e. the deviation between the intended position and the actual position transverse to the carrier 1.

In a fourth step S4, upon obtaining an indication of at least one signal being absent or reduced the processor 50 initiates a procedure for assessing if the first optical information carrier 1 has been removed from the optical apparatus. Initially, it may be checked if the absence of reduction of the signal is due to a completely non-reflective spot, a "black" spot, on the carrier 1 by a short radial scanning of the carrier 1.

Subsequently, as a fifth step S5, it is assessed if the carrier 1 is removed, and if affirmative a sixth step S6 should be initiated, the sixth step S6 is to render any further reproduction of information by the optical apparatus impossible until some pre-determined measures have been taken.

If it is assessed in the fifth step S5 that the carrier 1 is not removed but that some other irregularity such as a defect carrier 1 or temporary disorder of the optical apparatus a seventh step S7 of e.g. ordinary recovery procedure may be initiated.

FIG. 3 illustrates corresponding signals FE and CA without an optical carrier 1 under ramping of the focus actuator 9. In this proposed method, on detection of a focus servo loss, the optical apparatus starts a ramping signal to the focus actuator 9, such that it started to ramp up and down as also shown in FIG. 3. During the course of this ramping action, we can monitor the focus error signal (FE) or the central aperture (CA) signal. In the case where the carrier 1 is suddenly removed, the focus error signal (FE) and the central aperture (CA) signal will be as shown in FIG. 1. From the diagram, we see that both the signals display no peaks.

In contrast, FIG. 4 illustrates corresponding signals FE and CA with an optical carrier 1 under ramping of the focus actuator 9 in the case where there is only a normal focus control servo loss i.e. spinning carrier 1 is still present, but focus servo is lost through other means like defective carrier area, the focus error signal (FE) and the central aperture (CA) signal will be as shown in FIG. 4. From the diagram, we see that both the signals display peaks indicating the presence of the carrier 1.

By detecting the absence of peaks from the CA or FE signals, either through setting threshold level or by sampling the signals or other means, the optical apparatus can differentiate the carrier 1 removal condition from others reason. It can then react accordingly to either stop the apparatus temporally or disable the apparatus permanently. The latter may be done by supplying the radiation source 4 with a high current above the specifications of the radiation source resulting in an irreversible "burning" of the radiation source 4.

Although the present invention has been described in connection with the specified embodiments, it is not intended to be limited to the specific form set forth herein. Rather, the scope of the present invention is limited only by the accompanying claims. In the claims, the term comprising does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method for preventing interchange of a first optical information carrier (1) with a second optical information carrier in an optical apparatus, the optical apparatus being capable of reproducing information from an optical information carrier, the method comprising the steps of:
    detecting that the first information carrier (1) is present in the optical apparatus by focusing the light (5) at the first optical information carrier (1) in the optical apparatus,
    detecting reflected light (8) from the first optical information carrier (1), and
    generating a plurality of signals comprising a central aperture (CA) signal, RF signal, and a focus error (FE) signal from the detected light (8);
    upon obtaining an indication of unexpected behavior in at least one of the plurality of signals, after detection of the presence of the first information carrier:
        assessing if the first optical information carrier (1) has been removed from the optical apparatus, and
        rendering any further reproduction of information by the optical apparatus impossible until some pre-determined measures have been taken when said assessing indicates the first optical information carrier has been removed, wherein the assessing of the removal of the first optical carrier comprises:
    initiating a ramping process of the focused light; and
    determining an absence of peaks in at least one of the central aperture (CA) signal and the focus error (FE) signal.

2. A method according to claim 1, wherein the plurality of signals (CA, RF, FE) comprises at least one control signal, said control signal being applicable for controlling the relative position of the light (5) on the first information carrier (1).

3. A method according to claim 2, wherein the at least one focus error (FE) control signal is applied for controlling the focal position of the focused light (5).

4. A method according to claim 3 further comprising the step of displacing the focal position of the focused light (5).

5. A method according to claim 1, wherein the plurality of signals comprises at least one of an RF information signal and a central aperture (CA) information signal, said information signal being indicative of information stored on the first optical information carrier (1).

6. A method according to claim 1, wherein the indication of unexpected behavior in at least one of the plurality of signals is provided by comparing said at least one of the plurality of signals with a pre-determined threshold level.

7. A method according to claim 1, wherein the indication of unexpected behavior in at least one of the plurality of signals is provided by sampling said at least one of the plurality of signals substantially continuously.

8. A method according to claim 1, wherein the pre-determined measures comprises the step of reproducing encryption information from the first optical information carrier (1).

9. An optical apparatus capable of reproducing information from a first optical information carrier, the apparatus comprising:
    detection means for detecting that the first information carrier (1) is present in the optical apparatus comprising:
        a light source (4) capable of emitting light (5) onto the optical information carrier (1),
        focusing means (7, 9) for focusing the light (5) on the optical information carrier (1),
        photo detection means (10) for detecting reflected light (8) from the optical information carrier (1), and
        generating means (11, 50) for generating a plurality of signals comprising a central aperture (CA) signal, RF signal, and a focus error (FE) signal, from the photo detection means (50);
    wherein upon obtaining an indication of unexpected behavior in at least one of the plurality of signals after detection of the presence of the first information carrier (1)
    assessing if the first optical information carrier (1) has been removed from the optical apparatus, and rendering any further reproduction of information impossible until some pre-determined measures have been taken when said assessing indicates the first optical information carrier has been removed, wherein the assessing of the removal of the first optical carrier comprises:

initiating a ramping process of the focused light; and determining an absence of peaks in at least one of the central aperture (CA) signal and the focus error (FE) signal.

10. A non-transitory computer medium encoded with a computer program, which when loaded into a computer system comprising at least one computer having data storage means associated therewith causes the computer system to control an optical reproducing apparatus according to the method as claimed in claim 1.

* * * * *